United States Patent
Jensen

(10) Patent No.: US 6,857,814 B2
(45) Date of Patent: Feb. 22, 2005

(54) METHOD AND APPARATUS FOR REPAIRING A RISER BRACE IN NUCLEAR REACTOR

(75) Inventor: Grant C. Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/224,430

(22) Filed: Aug. 21, 2002

(65) Prior Publication Data
US 2004/0037615 A1 Feb. 26, 2004

(51) Int. Cl.[7] ................................. F16B 2/14
(52) U.S. Cl. ................................. 403/374.3; 248/245
(58) Field of Search .......................... 403/104, 13, 14, 403/373, 374.1, 374.2, 374.3; 248/245; 269/252

(56) References Cited

U.S. PATENT DOCUMENTS 3,865,095 A * 2/1975 Helmick .............. 403/374.3 X

2003/0095831 A1 * 5/2003 Monson et al. .......... 403/374.3

* cited by examiner

Primary Examiner—John R. Cottingham
(74) Attorney, Agent, or Firm—Harness, Dickey & Pierce, P.L.C.

(57) ABSTRACT

A clamp apparatus is provided which is designed to structurally replace a weld that attaches a riser brace assembly to a reactor vessel wall, and to stiffen the entire riser brace assembly, thereby increasing the natural vibration frequency of the riser brace assembly. Installation of the clamp apparatus should not require removal of any installed reactor hardware, such as jet pump assembly hardware or shroud repair hardware. In an embodiment, the clamp apparatus may include a first plate arranged so as to mate with a first groove on the riser brace, and a second plate arranged so as to mate with a second groove on the riser brace. The grooves provide alignment for the clamp apparatus, so that the first and second plates can be fixedly secured to the riser brace.

17 Claims, 7 Drawing Sheets

METHOD AND APPARATUS FOR REPAIRING A RISER BRACE IN NUCLEAR REACTOR

BACKGROUND OF THE INVENTION

1. Field of the Invention

This invention relates generally to nuclear reactors and, more particularly, to a method and apparatus for repairing a riser brace that lends lateral support to a jet pump assembly of a boiling water reactor.

2. Related Art

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically-shaped shroud.

FIG. 1 is a schematic, partial cross sectional view, with parts cut away, of a reactor pressure vessel (RPV) 20 for a boiling water reactor. RPV 20 has a generally cylindrical-shape and is closed at one end by a bottom head and at its other end by removable top head (not shown). A top guide (not shown) is situated above a core plate 22 within RPV 20. A shroud 24 surrounds core plate 22 and is supported by a shroud support structure 26. A downcomer annulus 28 is formed between shroud 24 and sidewall 30 of RPV 20.

An annulet nozzle 32 extends through sidewall 30 of RPV 20 and is coupled to a jet pump assembly 34. Jet pump assembly 34 may include a thermal sleeve 36 which extends through nozzle 32, a lower elbow (only partially visible in FIG. 1), and a riser pipe 38. Thermal sleeve 36 is secured at a first end (not shown) to a second end of the lower elbow. The first end of thermal sleeve 36 is welded to the second end of the lower elbow. A first end of the lower elbow similarly secured, or welded, to one end of riser pipe 38. Riser pipe 38 extends between and substantially parallel to shroud 24 and sidewall 30.

A riser brace assembly 40 stabilizes riser pipe 38 within RPV 20. The riser brace assembly 40 may be fabricated of type 304 stainless steel which, after periods of use, is susceptible to cracking at welded joints. The riser brace assembly 40 is fixedly connected between shroud 24 and sidewall 30, and primarily provides lateral support to the jet pump assembly 34 via riser pipe 38, as shown in FIG. 1. Additionally the riser brace assembly 40 is designed to accommodate for differential thermal expansion that results from reactor start-up and heat-up, and flow induced vibration that is incumbent in the reactor water recirculation system (not shown).

FIG. 2 illustrates the riser brace assembly 40 of FIG. 1 in further detail. Riser brace assembly 40 primarily provides lateral support to the jet pump assembly 34 via riser pipe 38, and includes a riser brace block 43 and two riser brace leaves, an upper riser brace leaf 41 and a lower riser brace leaf 42. Leaves 41 and 42 are attached to riser brace block 43 by welds, and riser brace block 43 is welded to a support pad 130 which in turn is affixed to RPV sidewall 30. At the other end, riser brace assembly 40 is connected to a yoke such as brace plate 49, which is typically a ½-inch thick plate that is welded to the riser pipe 38.

In the riser brace assembly 40 of FIG. 2, welds include the weld which attaches brace plate 49 to riser pipe 38, welds attaching riser brace block 43 to support pad 130, and welds attaching leaves 41 and 42 to brace plate 49. These welds are field welds (made on site). The welds connecting riser brace block 43 to upper and lower riser brace leaves 41 and 42 are shop welds (e.g., pre-fabricated in the shop)

Weld failure due to vibration fatigue, and/or weld cracking due to intergranular stress corrosion cracking (IGSCC) could cause one of the welds joining the riser brace assembly 40 to the RPV 20 to fail. Separation of the riser brace 40 near this weld area could adversely impact safety in BWRs. Potentially, should a riser brace assembly 40 break away from RPV 20 (e.g., at RPV sidewall 30), the riser pipe 38 becomes unstabilized, and the jet pump assembly 34 could be adversely affected. If just one jet pump assembly is damaged, a substantial amount of piping must either be replaced or repaired. Since weld repairs in the downcomer annulus 28 area are typically not practical due to inaccessibility, and the potential for excessive radiation exposure to personnel is real, a need exists for a method and apparatus of repairing cracked riser braces involving little or no in-vessel machining.

SUMMARY OF THE INVENTION

The present invention provides a method and apparatus for repairing a riser brace assembly in a reactor pressure vessel of an operating BWR. In an embodiment, the apparatus includes a clamp apparatus designed to structurally replace a weld (e.g., attaching a riser brace assembly to a reactor vessel wall); and to stiffen an entire riser brace assembly, thereby increasing the natural vibration frequency of the riser brace assembly. Installation of the clamp apparatus should not require removal of any installed reactor hardware, such as jet pump assembly hardware or shroud repair hardware.

In an embodiment, the clamp apparatus may include a first plate arranged so as to mate with a first groove on the riser brace assembly, and a second plate arranged so as to mate with a second groove on the riser brace assembly. The grooves provide alignment for the clamp apparatus, so that the first and second plates can be fixedly secured to the riser brace assembly.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

A riser brace repair clamp apparatus in accordance with the invention is designed to (1) structurally replace a weld attaching an upper riser brace leaf and/or a lower riser brace leaf to a reactor vessel wall at a riser brace block; and to (2) stiffen an entire riser brace assembly, thereby increasing the natural vibration frequency of the riser brace assembly. In general, the installation involves electric discharge machining (EDM) a location near a riser brace assembly/RPV sidewall interface in preparation for installing the riser brace clamp apparatus, assembling the hardware in the reactor, and preloading and locking a plurality of mechanical fasteners to secure riser brace clamp apparatus in place.

In order for the riser brace repair clamp apparatus to interface with an RPV sidewall, dual-tapered grooves are machined by EDM in an upper surface and a lower surface of a riser brace block that is part of the riser brace assembly. These grooves receives tongue portions from a top plate and a support plate of the riser brace repair clamp apparatus. Additionally, clearance holes are machined by EDM through an upper riser brace leaf and a lower riser brace leaf of the riser brace assembly, to allow passage of a central block bolt of the riser brace repair clamp apparatus, which provides additional support in securing riser brace repair clamp apparatus to the riser brace assembly.

Figure 3:
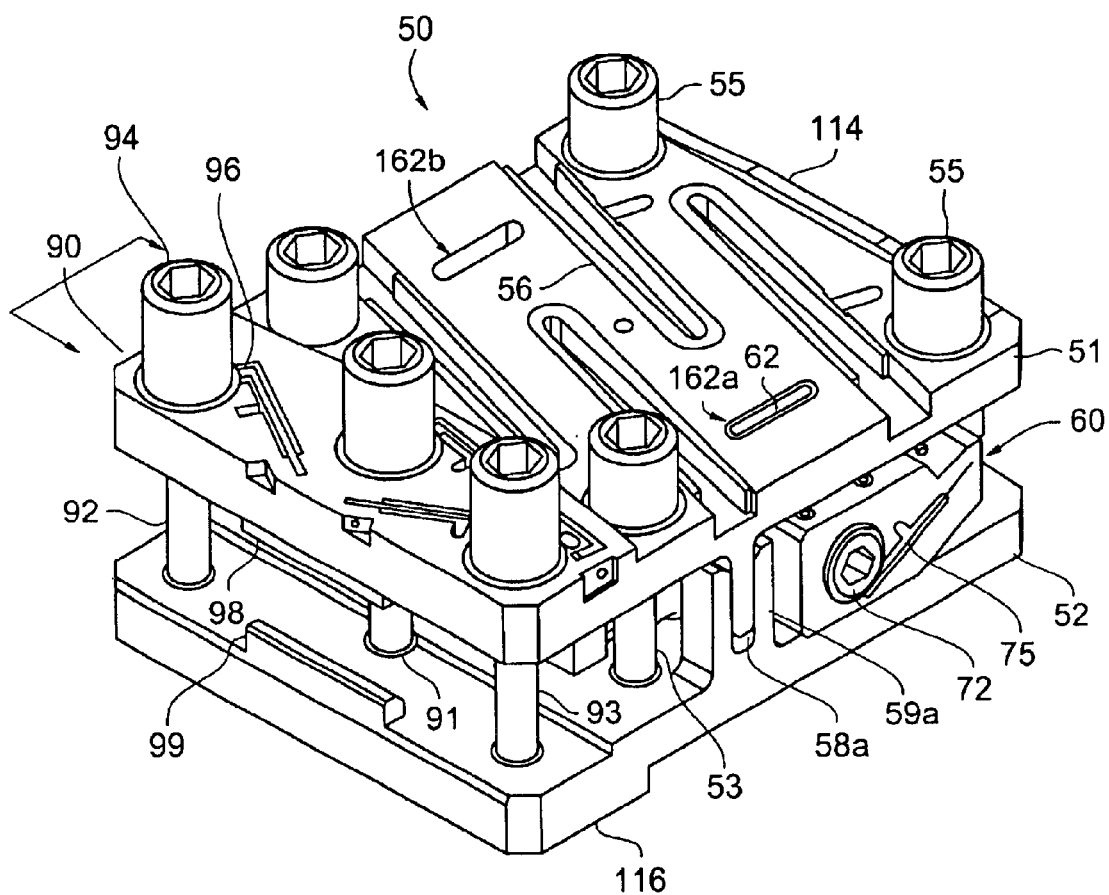
FIG. 3 is an isometric view of a riser brace repair clamp apparatus in accordance with an exemplary embodiment of the invention.

FIG. 3 is an isometric view of a riser brace repair clamp apparatus (hereinafter clamp apparatus 50) in accordance with an exemplary embodiment of the invention. The clamp apparatus 50 fixedly secures riser brace assembly 40 to RPV sidewall 30. Clamp apparatus 50 includes a top plate 51 and a support plate 52. Top plate 51 and support plate 52 sandwich a wedge assembly 60. As will be illustrated further, clamp apparatus 50 is configured to be positioned at an interface between RPV sidewall 30 and riser brace assembly 40. Top plate 51 and support plate 52 are fixedly connected around wedge assembly 60 by a plurality of clamp bolts 53 and clamp bolt nuts 55. Additionally, clamp apparatus 50 includes a block portion 90 (see dotted line) that includes a central block bolt 91 and side block bolts 92 and 93, for securing the clamp apparatus 50 to riser brace block 43 of the riser brace assembly 40. Block portion 90 is actually an integral part of the top plate 51 and support plate 52, and is identified as such only to distinguish the differences in the retaining elements hereinafter described in further detail below in block portion 90.

Additionally as will be explained in further detail below, top plate 51 includes retaining elements including clamp bolt nut ratchet springs 56 and block bolt nut latch springs 96, which allow rotation of clamp bolt nuts 55 and block bolt nuts 94 in only one direction. Wedge assembly 60 may be comprised of several portions or components that are fixedly secured together via a wedge bolt 72 and nut plate 81. Wedge assembly 60 also includes a latch 75 for securing wedge bolt 72 in place.

Additionally as will be explained in more detail below, top plate 51 and support plate 52 included tongue portions for mating with corresponding grooves that are machined in surfaces of the riser brace assembly 40. Top plate 51 includes an upper mating tongue 98; and support plate 52 is provided with a lower mating tongue 99. Further, top plate 51 includes slots 162a and 162b, which are provided to receive a key 62 from one of the wedge components of wedge assembly 60, so as to ensure that top plate 51, support plate 52 and wedge assembly 60 are properly aligned.

Figure 1:
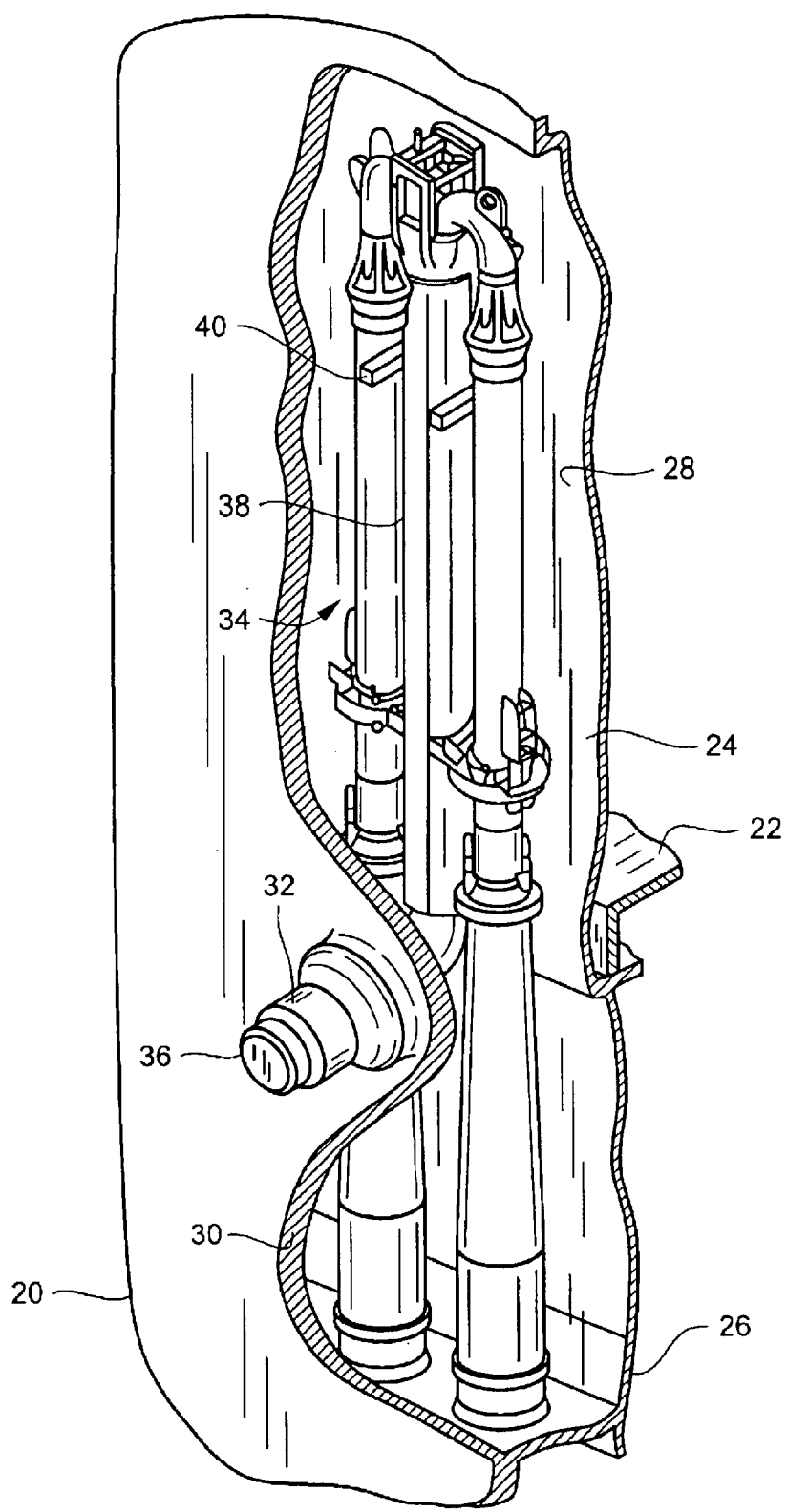
FIG. 1 is a schematic, partial cross-sectional view, with parts cut away, of a reactor pressure vessel of a boiling water nuclear reactor.
Figure 2:
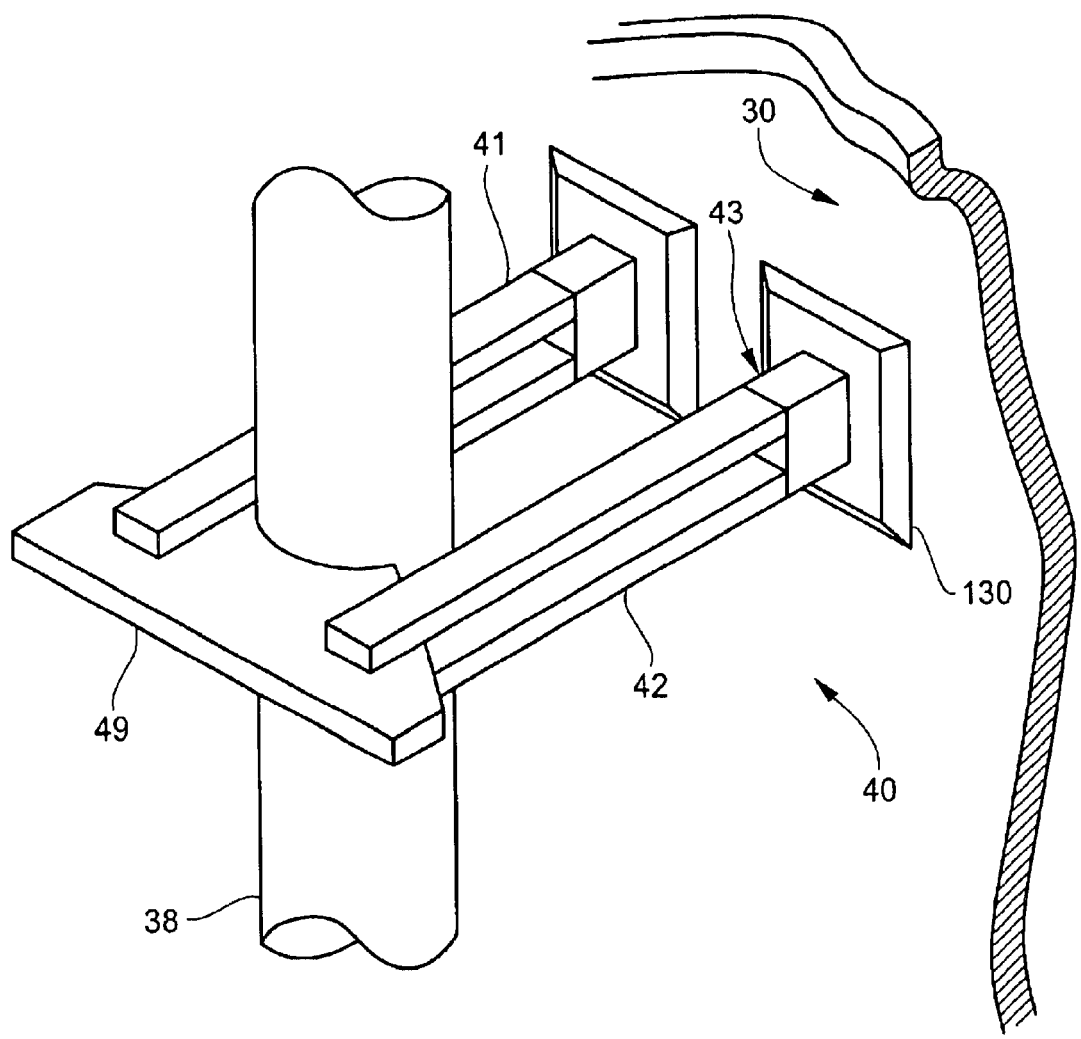
FIG. 2 illustrates the riser brace assembly in accordance with an exemplary embodiment of the invention.
Figure 4:
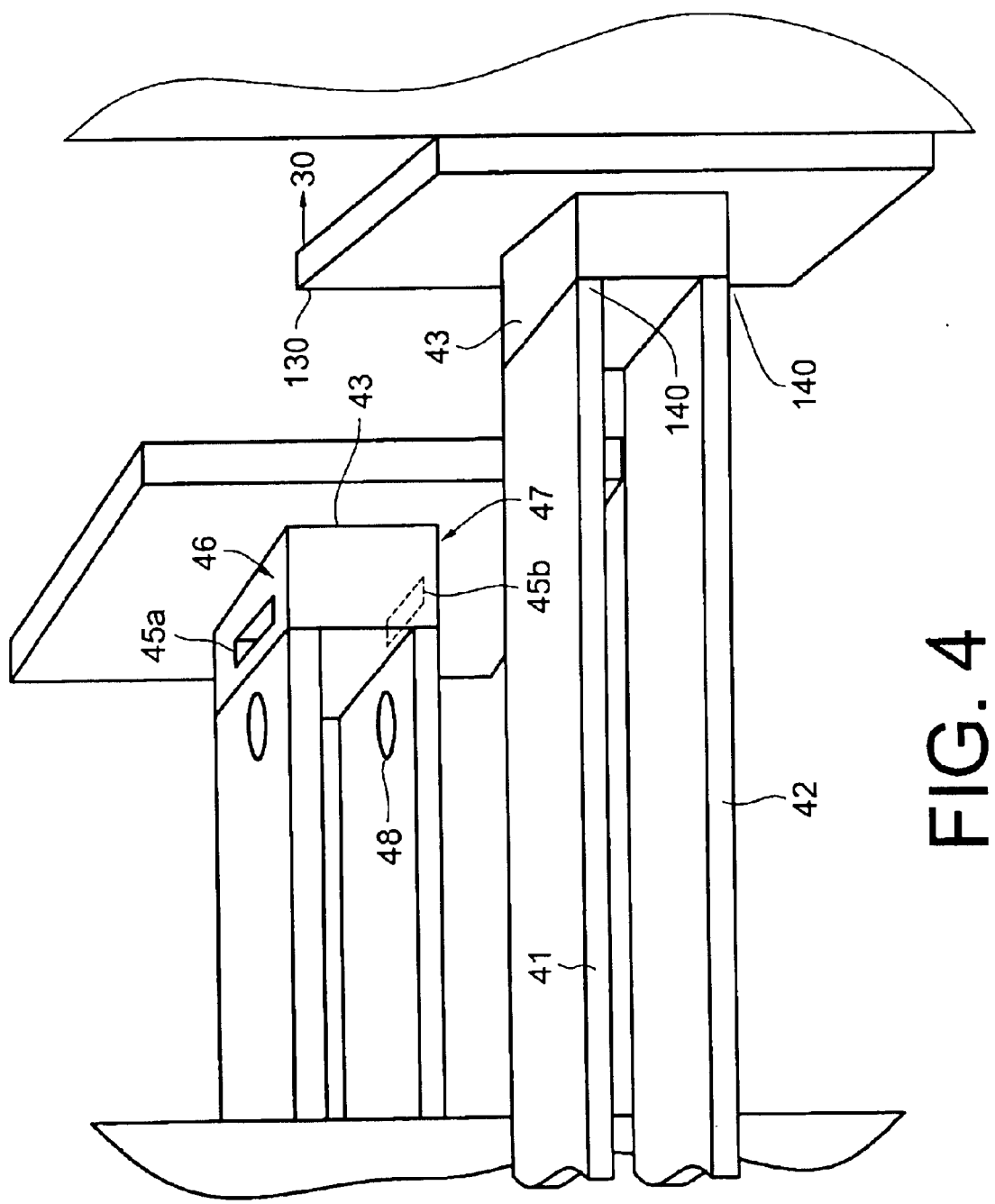
FIG. 4 illustrates a detailed view of the riser brace assembly before and after machining in accordance with the invention.

FIG. 4 illustrates the riser brace assembly 40 of FIG. 2 before and after machining, in preparation for installing clamp apparatus 50. As discussed above, riser brace apparatus 40 includes an upper riser brace leaf 41 and a lower riser brace leaf 42 that are attached to a riser brace block 43 by welds 140. Riser brace block 43 is fixedly attached to a pad 130 which in turn is affixed to RPV sidewall 30. The riser brace leaves 41, 42 straddle a riser pipe 38 that supports a jet pump assembly 34 (not shown for clarity), providing lateral support to riser pipe 38. Riser brace leaves 41 and 42 are attached at the other end (not shown) to a brace plate 49, which in turn is welded to riser pipe 38

Separation of the riser brace assembly 40 at an area near and/or at one of the welds 140 could adversely impact safety in some BWRs. Potentially, should a riser brace assembly 40 break away from RPV 20 (e.g., at RPV sidewall 30), the riser pipe 38 becomes unstabilized, and hence the jet pump assembly 34 could be adversely affected. Accordingly, as will be described in greater detail below, the clamp apparatus 50 is installed on riser brace assembly 40 near and/or at welds 140, between riser brace block 43 and riser brace leaves 41 and 42.

As shown in FIG. 4, in order to facilitate this installation, grooves 45a and 45b are machined into an upper surface 46 and a lower surface 47 of riser brace block 43. These grooves are to receive tongues 98 and 99 of the top plate 51 and support plate 52. Additionally, clearance holes 48 are machined into leaves 41 and 42 in order to receive center block bolt 91 of the block portion 90 of the clamp assembly 50.

Figure 5:
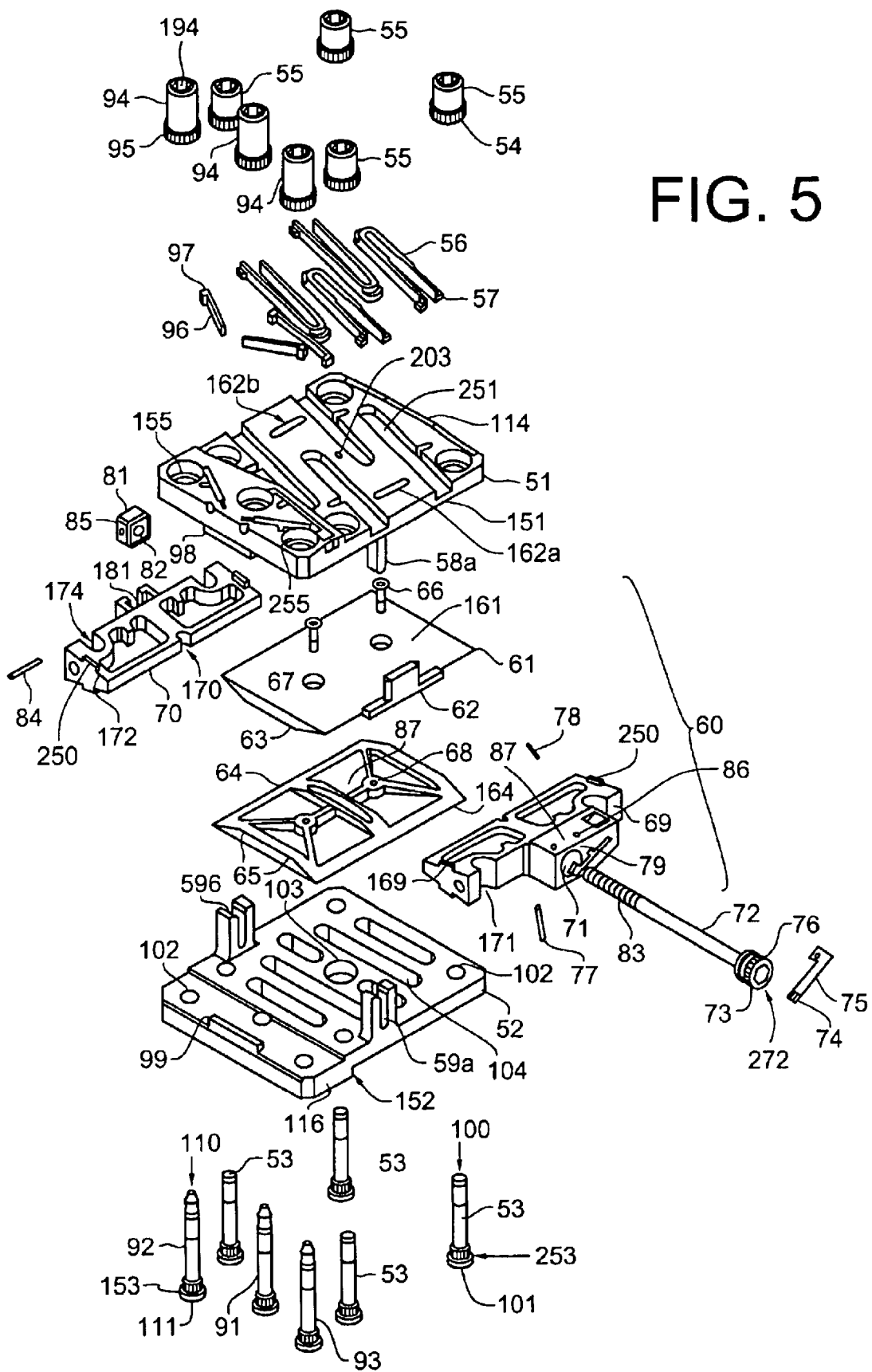
FIG. 5 is a exploded prospective view of the clamp apparatus shown in FIG. 3, in accordance with an exemplary embodiment of the present invention.

FIG. 5 is an exploded perspective view of the clamp apparatus 50 shown in FIG. 3. Primary components of the clamp apparatus 50 include a top plate 51, a support plate 52, a wedge assembly 60, and associated mechanical fasteners and retaining devices, to be explained in detail hereinafter.

The top plate 51 includes necessary slots, holes, and under-cuts to contain clamp bolt nut ratchet springs 56 and block bolt nut latch springs 96 of block portion 90. For example, slots 251 are provided to reduce mass of top plate 51 and to receive clamp nut ratchet springs 56 and block bolt nut latch springs 96; and counter bores 155 receive clamp bolt nuts 55 or block bolt nuts 94 respectively. Tongues 58a and 58b (58b not shown in FIG. 5) are incorporated in top plate 51 and protrude from a bottom surface 151 of the top plate 51. Tongues 58a and 58b mate with "blind" grooves 59a and 59b of the support plate 52. It should be understood that the tongue and groove portions could be reversed (e.g., tongues 58a/b could be provided on support plate 52 with grooves 59a/b being provided on top plate 51). Further, top plate 51 includes a tapped through hole 203 to receive special tooling for installing the clamp apparatus 50 in RPV 20.

Figure 6:
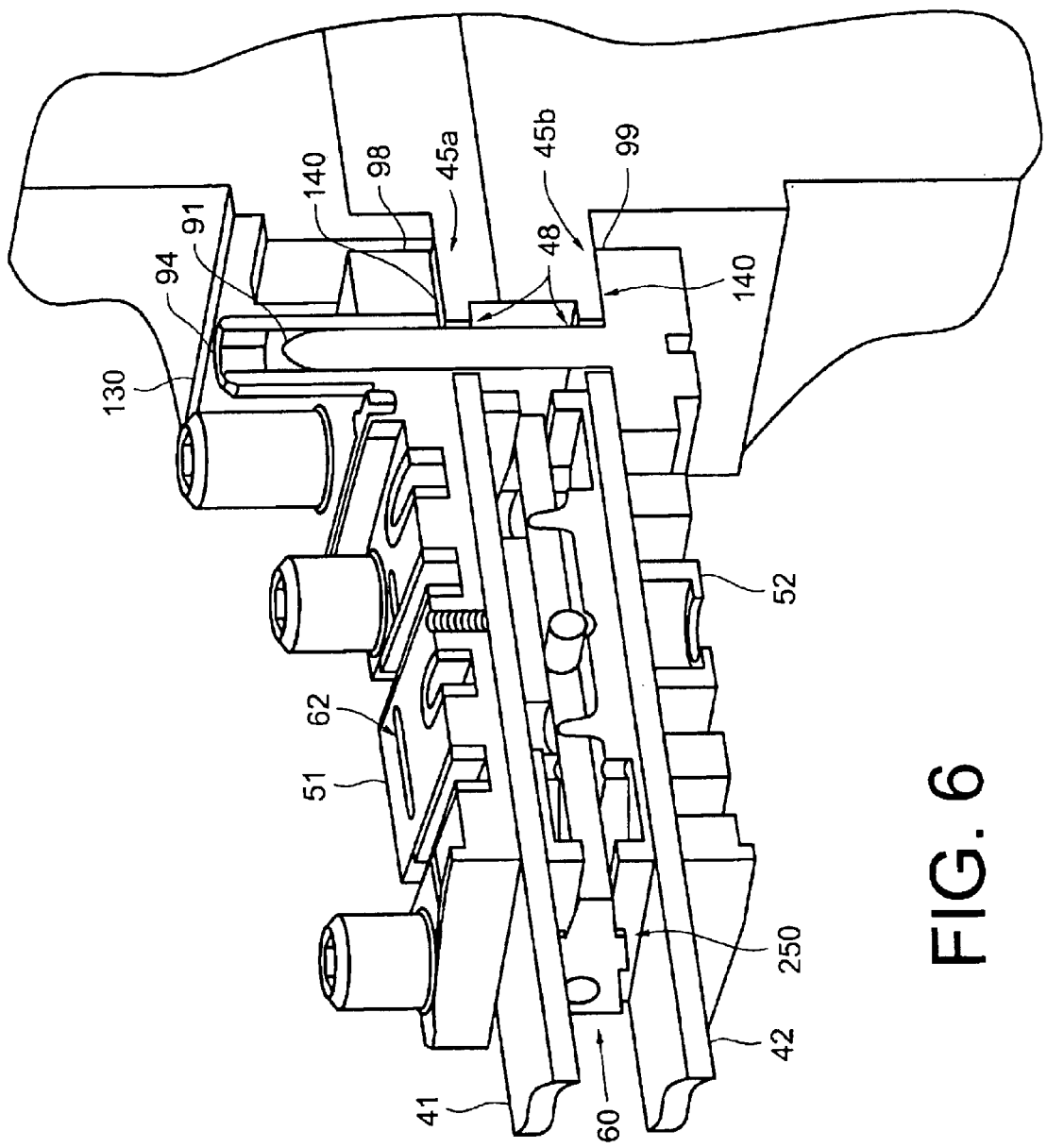
FIG. 6 illustrates the connection of the clamp apparatus within a reactor pressure vessel (RPV) in accordance with an exemplary embodiment of the present invention.

In addition, at least one slot 162a/162b is provided to mate with a key 62 of a keyed wedge 61 of the wedge assembly 60. Preferably, only one slot 162a/162b is utilized for any given installation. An alternate slot 162a or 162b may be provided to enable a "mirrored" installation of the wedge assembly 60, if necessary, to install the wedge assembly 60 from an opposite side (e.g., 180 degrees) of the clamp apparatus 50, than what is shown in FIGS. 3, 5 or 6. The mirrored installation requires that the movable wedge 69 be substituted with a mirrored movable wedge part 69 and mirrored latch 75 (not shown).

The clamp bolt nuts 55 and block bolt nuts 94 are nearly identical. The block bolt nuts 94 are longer than the clamp bolt nuts 55 to accommodate the longer block bolts 91–93. Block bolt nuts 94 feature forty-eight equally spaced ratchet teeth 95 that are machined into the outer circumference of the block bolt nuts 94. The block bolt nuts 94 are preferably threaded with an internal ½-20UNF tap (not shown), although other tap dimensions are within the purview of this invention. Additionally, ample bolt head-room and an internal hexagon interior shape 194 are provided, thus enabling the block bolt nuts 94 to be rotated as desired.

Clamp bolt nut ratchet springs 56 and block bolt nut latch springs 96 each include ratchet teeth 57 and 97 that interface with clamp bolt nut ratchet teeth 54 of the clamp bolt nut 55 and block bolt nut ratchet teeth 95 of block bolt nuts 94. As the nuts 55, 94 are rotated in the direction to increase bolt preload, the springs and latches behave like cantilever beams in deflecting the necessary distance to allow rotation of the respective nuts 55 or 94. The ratchet teeth 54/57 and 95/97 are oriented such that rotation in the desired direction is only permitted. The nuts 55 or 94 can be removed only after the springs 56, 96 and ratchet teeth 54/57 and 95/97 have been "cammed back" to provide clearance for the subject teeth 54 or 95.

The clamp bolts 53 and block bolts 91–93 are similar. The block bolts 91–93 are longer than the clamp bolts 53 and incorporate a longer, tapered end that is conducive to successful block bolt nut 94 installation. Both clamp bolts 53 and block bolts 91–93 preferably contain external ½-20UNF threads at the distal end 100, 110 and ⁹⁄₁₆-20UN left-handed threads at a proximal end (bolt head end) 101, 111. Each bolt 53, 91–93 has a flange 153 that is provided at the proximal end 101, 111 which seats in a counter-bore recess at an underside 152 of the support plate 52, upon assembly of clamp apparatus 50. The bolts 53 and 91–93 are seated tight in the support plate 52, preferably by using a ¼ inch internal hexagon socket 253 that is machined in the proximal end 101, 111 of the clamp bolts 53 and block bolts 91–93.

Accordingly, features of the support plate 52 include the aforementioned tongue 99 for mating with groove 45b machined in riser brace block 43, seven counter-bored threaded openings 102 designed to receive the four clamp bolts 53 and three block bolts 91–93, blind groove 59a and 59b to receive corresponding tongues 58a and 58b of the top plate 51, a counter-bored slot opening 103 for connection to installation tooling, and slots 104 provided therein that are designed to reduce mass or weight of the support plate 52. The counter-bored threaded openings 102 are preferably designed with ⁹⁄₁₆-20UN left-hand threads to receive the proximal ends 101, 111 of the clamp bolts 53 and block bolts 91–93. This thread selection ensures that the clamp bolts 53 and block bolts 91–93 would not loosen under the action of torquing the clamp bolt nuts 55 and block bolt nuts 94 to the respective clamp bolts 53 and block bolts 91–93. In addition, the diameter of the threaded openings 102 is large enough to allow passage of the distal end 100, 110 of the clamp bolts 53 and block bolts 91–93 during assembly.

As mentioned, the blind grooves 59a and 59b of support plate 52 mate with tongue portions 58a and 58b of the top plate 51. This interface ensures alignment of the support plate 52 and top plate 51 in both the radial and tangential directions, thus ensuring proper clamp bolt 53 and block bolt 91–93 positioning. This bolt positioning ensures that the clamp bolt nuts 55 and block bolt nuts 94 are properly centered in the top plate 51 counter-bores 155, which facilitates proper engagement of ratchet teeth 54 on the clamp bolt nuts 55 with ratchet teeth 57 on the clamp bolt nut ratchet springs 56, and engagement of ratchet teeth 95 on block bolt nuts 94 with teeth 97 or block bolt nut latch springs 96. The top plate 51 includes a web 114 at an edge opposite that of where block portion 90 is located on the top plate 51 that increase thickness at the center of top plate 51. Similar to the top plate 51, the support plate 52 incorporates a web at an edge opposite that of where block portion 90 is located on the support plate 52. Webs 114, and the thickened portions 116 (see FIGS. 3 and 5) of the top plate 51 and support plate 52 act in unison to increase the section modulus of the top plate 51 and support plate 52 against bending.

The wedge assembly 60 consists of four wedge components: a keyed wedge 61, a stationary wedge 64, a movable wedge 69 and a coupled wedge 70, and associated mechanical fasteners and retaining devices. The first of these wedge components is a keyed wedge 61. A flat surface 161 of the keyed wedge 61 mates with an underside surface of the upper riser brace leaf 41. Additionally, the keyed wedge 61 includes a key 62 which aids in positioning the wedge assembly 60 relative to the upper riser brace leaf 41. This key 62 also interfaces with the top plate 51, so that wedge assembly 60 is properly positioned in relation to the other components of the clamp apparatus 50. Opposing inclined surfaces 63 of the keyed wedge 61 form a dihedral angle of 160 degrees.

The stationary wedge 64 is essentially identical to the keyed wedge 61, except that there is no key 62. A flat surface 164 of the stationary wedge 64 mates with a top surface of the lower riser brace leaf 42. As with the keyed wedge 61, opposing inclined surfaces 65 of the stationary wedge 64 form a dihedral angle of 160 degrees.

Shoulder screws 66 are provided to maintain the keyed wedge 61 and the stationary wedge 64 in alignment with one another. Counter-bored clearance holes 67 in the keyed wedge 61 allow for the passage of the shoulder screws 66. The depth of the counter-bores in clearance holes 67 accommodates a range of motion between the keyed wedge 61 and stationary wedge 64 components. The shoulder screws 66 are stationary with the stationary wedge 64 by virtue of being threaded into tapped holes 68 in the stationary wedge. The opposing inclined surfaces 63 and 65 of the keyed wedge 61 and stationary wedge 64 form an included angle of 20 degrees.

The remaining wedge components of wedge assembly 60 include the movable wedge 69 and the coupled wedge 70. Common features to both of these wedge components include a circular through hole (shown at 170 in coupled wedge 70) which receives a wedge bolt 72. Movable wedge 69 and the coupled wedge 70 also each have inclined surfaces (169 and 172) which form a 20 degree included angle, and cut-outs (at 171 and 174) which provide clearance for the four clamp bolts 53. The movable wedge 69 and coupled wedge 70 oppose each other with their inclined surfaces 169 and 172 mating with the inclined surfaces 63 and 65 of the keyed wedge 61 and stationary wedge 64.

The four wedge components 61, 64, 69 and 70 have a natural tendency to stay in alignment when the inclined surfaces 63, 65, 169 and 172 are properly mated, with exception of a direction perpendicular to the axis of the wedge bolt 72. In order to maintain the desired alignment in this direction, "ledge" features are incorporated in the design of the movable wedge 69 and coupled wedge 70. Specifically referring to FIGS. 5 and 6, protrusions 250 are formed at edges of the movable wedge 69 and coupled wedge 70 to ensure that all four wedges are in alignment in the direction perpendicular to the axis of the wedge bolt 72, when wedge assembly 60 is assembled.

The movable wedge 69 includes a circular counter-bored recess 71 and the circular through hole 170 (not shown) to receive the wedge bolt head 272 and wedge bolt 72. The design of the wedge bolt 72 incorporates thirty-six equally spaced ratchet teeth 73 which are machined into the periphery of the bolt head 272. These ratchet teeth 73 engage teeth 74 of a latch 75, thereby preventing the wedge bolt 72 from becoming loose in a flow-induced vibration environment that is indigenous to the riser brace assembly 40.

Additionally, a circular groove 76 is provided in the head 272 of the wedge bolt 72. The purpose of this circular groove 76 is to maintain the wedge bolt 72 captive with the movable wedge 69. This is accomplished by installing a dowel pin 77 into a drilled passageway (not shown) whose axis is perpendicular to the axis of rotation of the wedge bolt 72. The dowel pin 77 is held captive by virtue of an interference fit between dowel pin 77 and the drilled passageway, the diameter of which is slightly smaller than the diameter of the dowel pin 77. After the dowel pin is inserted, the opening of the drilled passageway is slightly swaged in order to secure dowel pin 77 within the drilled passageway. The drilled passageway in the movable wedge 69 is precisely located to be in line with the circular groove 76 of the wedge bolt 72, thus allowing rotational movement and preventing translational movement of the wedge bolt 72.

The latch 75 resides in a machined recess 79 of the movable wedge 69, and is similarly held captive by installing an appropriate dowel pin 78. The ratchet teeth 74 of the latch 75 interact with the ratchet teeth 73 of the wedge bolt 72 so that as the wedge bolt 72 is rotated, the latch 75 deflects like a cantilever beam. The deflection is sufficient enough to allow passage of the wedge bolt ratchet teeth 73. Angles machined into the respective ratchet teeth 73 and 74 are configured so as to only allow rotation of the wedge bolt 72 in a direction which results in shortening the distance between the movable wedge 69 and coupled wedge 70. This motion acting through the inclined surfaces 63, 65, 169 and 172 of all of the wedge components results in the keyed and stationary wedges 61 and 64 separating from one another, with their flat surfaces 161 and 164 being maintained parallel to one another.

The coupled wedge 70 includes a nut plate 81 that is mounted so as to bear on a flat surface 181 that is perpendicular to the circular through hole 170 that receives wedge bolt 72. The nut plate 81 incorporates a tapped through hole 82 to receive the threaded end 83 of the wedge bolt 72. The nut plate 81 is allowed to float but is prevented from rotating, thus acting in conjunction with the wedge bolt 72 to control a relative distance between the movable wedge 69 and coupled wedge 70. Specifically, nut plate 81 is held captive to the coupled wedge 70 by virtue of a dowel pin 84 pressed into the coupled wedge 70. The dowel pin 84 passes through an oversized through hole 85 in the nut plate 81, thus enabling the nut plate 81 to float, but not to bind with rotation of the wedge bolt 72. Dowel pin 84 is similar to dowel pin 77 in that it is held captive by an interference fit in drilled passageway 85.

Accordingly, wedge components 61, 64, 69 and 70 and their associated fasteners are designed with an intent of minimizing overall mass of the clamp apparatus 50. In addition, two small blind holes 86 located in a top surface 87 of the movable wedge 69 are provided for tooling purposes. The clamp apparatus 50 is fully installed, and hence repair of the riser brace assembly is completed, after all of the mechanical fasteners are properly preloaded and the ratchet springs and latches are verified to be properly engaged.

FIG. 6 illustrates the connection of the clamp apparatus 50 within a reactor pressure vessel 20 (RPV) in accordance with an exemplary embodiment of the present invention. Specifically, FIG. 6 illustrates a cross-section (e.g., half-portion) of clamp apparatus 50 in order to more clearly depict how the various components of clamp apparatus 50 interface with components of the riser brace assembly 40.

Tongue 98 of top plate 51 and tongue 99 of support plate 52 are preferably tapered so as to engage corresponding dual-tapered grooves 45a, 45b that are provided in the upper and lower surfaces 46, 47 of riser brace block 43. The riser brace leaves 41 and 42, which are attached to the riser brace block 43 at weld 140, are sandwiched between the top plate 51, support plate 52, and wedge assembly 60. Center block bolt 91 passes through clearance holes 48 in order to secure the block portion 90 of the clamp apparatus 50 to riser brace lock 43.

The wedge assembly 60 is adjustable, and is installed between the riser brace leaves 41 and 42, thus filling the space between the leaves 41 and 42. Components of the wedge assembly 60 are configured so as to evenly distribute stress on said riser brace. The top plate 51 and support plate 52 are installed above the upper riser brace leaf 41 and below the lower riser brace leaf 42, respectively. Mechanical fasteners are provided at corners of the clamp apparatus 50 to provide mechanical preload (e.g., clamp bolts 53, clamp bolt nuts 55, etc.), wedge bolt 72 and nut plate 81 additionally provides preload in wedge assembly 60. Tongue and groove interfaces (e.g. interface between tongue 58a and groove 59a, for example) between top plate 51 and support plate 52 provide alignment for top plate 51 and support plate 52 in both tangential and radial directions, and are able to slide in the axial direction relative to the axis of RPV 20. If the key 62 in keyed wedge 61 were to be omitted, there would be no mechanism to precisely locate the wedge assembly 60 so that it properly engages leaves 41 and 42.

The clamp apparatus 50 having been described, a method of repairing/replacing a weld in a riser brace assembly 40 is now described. Reference should also be made to FIGS. 3–6 to aid understanding of the following description.

Figure 7:
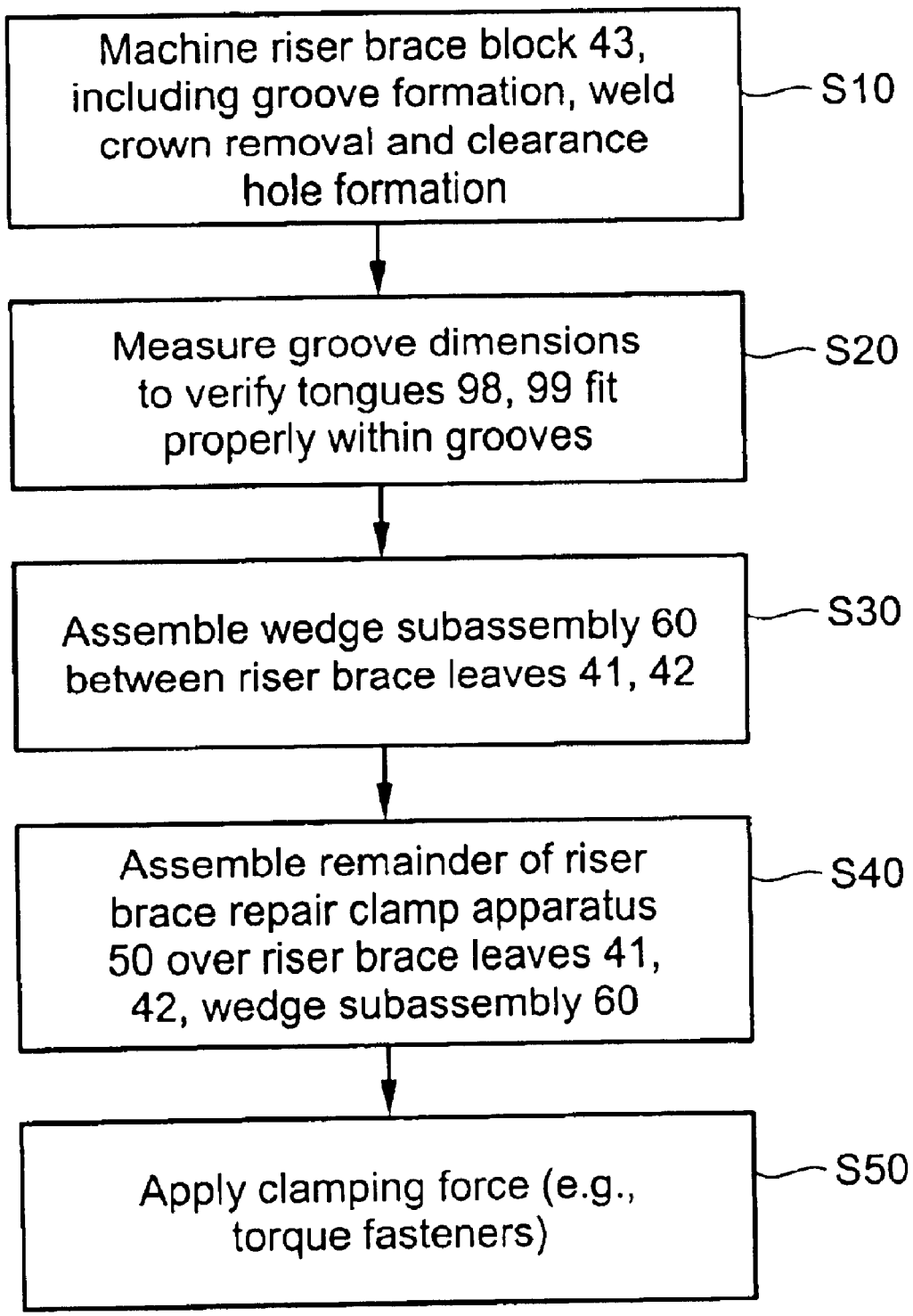
FIG. 7 is a flowchart illustrating an exemplary method of repairing a riser brace assembly in accordance with the invention.

FIG. 7 is a flowchart illustrating an exemplary method of repairing a riser brace assembly in accordance with the invention. In general, after reactor safety procedures for maintenance/repair personnel have been complied with, and an overall inspection of the installation locations has been videotaped, looking for anything unexpected relating to the as-built configuration of the riser brace assemblies, the location at which the clamp apparatus 50 is to be installed is prepared. Components of the clamp apparatus 50 will be transported by special tooling connected to clamp apparatus 50 at several locations (hole 103 in support plate 52, tapped holes 86 in the movable wedge 69, and tapped through hole 203 in top plate 51) to a submerged location in RPV 20.

Specifically, a portion of the riser brace block 43 is machined (Step S10). This may be accomplished by in-vessel machining (e.g., electric discharge machining (EDM), which machines away a desired portion of the riser brace block 43. Particularly, upper surface 46 and lower surface 47 of riser brace block 43 are machined by EDM to remove any weld crown at a riser brace block-to-riser brace leaf interface.

Additionally in this machining step, dual tapered grooves 45a, 45b are machined in the upper and lower surfaces 46, 47 of the riser brace block 43. Two grooves are machined, one each in the upper surface 46 and lower surface 47 of the riser brace block 43, hence dual-tapered grooves. Further during this machining step, clearance holes 48 are also provided in the upper riser brace leaf 41 and lower riser brace leaf 42 to allow passage of the central block bolt 91 in the block portion 90 of clamp apparatus 50.

Necessary as-machined measurements are made (Step S20) of the dual-tapered grooves 45a and 45b. These measurements are used to ensure that the tongues 98 and 99 fit properly within the dual tapered grooves 45a, 45b. Based on the measurements, tongues 98 and 99 are field machined to ensure a proper fit.

Prior to installing the clamp apparatus 50, the wedge assembly 60 is assembled and installed (Step S30). As maneuvering within RPV 20 is difficult, since the clamp apparatus 50 is to be installed remotely at a riser brace assembly 40 that is often in excess of 60 feet away from an access cover and submerged, as much pre-assembly of components is performed as is practical. In general, the keyed wedge 61, stationary wedge 64, movable wedge 69 and coupled wedge 70 are pre-assembled, with shoulder screws 66, latch 75, nut plate 81, wedge bolt 72 and dowel pins 77, 78 and 84 already inserted and secured in their respective wedge components. A space between the upper and lower riser brace leaves 41 and 42 is verified to be free of any foreign material (the leaf surfaces should be smooth and flat). A distance or space between the upper and lower riser brace leaves 41 and 42 is ascertained, and wedge assembly 60 thickness is set to a predetermined thickness, in order to facilitate installation between the riser brace leaves 41 and 42. The entire wedge assembly 60 is then installed between the riser brace leaves 41 and 42, with the keyed wedge 61 arranged in the desired location bearing against the upper riser brace leaf 41.

The remaining components of clamp apparatus 50 are assembled (Step S40). The support plate 52 (with clamp bolts 53 and block bolts 91–93) are positioned in RPV 20 with the central block bolt 91 extending through clearance holes 48 in the riser brace leaves 41 and 42, and with the tongue 99 of the support plate 52 engaged in the groove 45b of the lower surface 47 of riser brace block 43. Top plate 51, with clamp bolt nut ratchet springs 56 and block bolt nut latch springs 96 already secured in place, is positioned above and over the clamp bolts 53 and block bolts 91–93 that extend from bore openings 255. As with the wedge assembly 60, these components are therefore pre-assembled outside RPV 20 (e.g., field assembled) in order to limit the complexity of installation within RPV 20.

Specifically, top plate 51 and its associated nuts 55 and 94 are positioned in the RPV 20 with the tongue 98 of the top plate engaged in the groove 45a in the upper surface 46 of riser brace block 43, and the key 62 of the keyed wedge 61 being engaged in slot 162a of the top plate 51. As shown in FIG. 6, top plate 51 should be in contact with an upper surface of the upper riser brace leaf 41, and the support plate 52 should be in contact with an underside surface of the lower riser brace leaf 42, with the clamp bolts 53 straddling the wedge assembly 60, and with clamp bolts 53 and block bolts 91–93 protruding through bore openings 255 of the top plate 51.

Clamping forces are applied (Step S50) to fixedly secure the clamp apparatus 50 to the riser brace assembly 40. The three block nuts 91–93 and the four clamp bolt nuts 55 are installed and initially tightened to a desired torque (e.g., to 2+/−1 lb-ft, for example). The block bolt nuts 94 and clamp bolt nuts 55 are gradually torqued (in 5 lbs-ft increments up to 30 lbs-ft, for example) in an alternating fashion to maintain even pressure-on the clamp assembly 50.

The wedge bolt 72 is initially torqued (e.g., to 10+/−2.5 lb-ft, for example) in order to increase the wedge assembly 60 thickness to fill the space between the upper and lower riser brace leaves 41 and 42. The torquing process to the wedge bolt 72 is repeated until the teeth 74 of the latch 75 are fully engaged with the teeth 73 of the wedge bolt 72. If necessary, the torque of wedge bolt 72 is increased to bring the subject latch teeth 74 into full engagement. Similarly, the teeth 57 of clamp bolt nut ratchet springs 56 and the teeth 97 of block bolt nut latch springs 96 are verified to be fully engaged with the teeth 54 of clamp bolt nuts 55 and teeth 95 of the block bolt nuts 94, respectively. If necessary, torque to block bolt nuts 94 and clamp bolt nuts 55 is increased to bring the subject latch teeth 95, 54 into full engagement.

The installed clamp apparatus 50 structurally replaces a weld 140 attaching upper riser brace leaf 41 and/or lower riser brace leaf 42 to riser brace block 43. Additionally, the installed clamp apparatus 50 stiffens the entire riser brace assembly 40, thereby increasing the natural vibration frequency of the riser brace assembly 40. This is significant due to the flow-induced vibration that is inherent in a jet pump assembly 34 of a BWR. The riser brace assembly 40 is designed to accommodate the differential thermal expansion that results from reactor start-up and heat-up, and to accommodate the flow-induced vibration that is incumbent in the reactor water recirculation system (not shown) due to reactor recirculation pumps. This is because the present method and clamp apparatus of the invention increases the natural vibration frequency of the riser brace assembly 40 above a vane passing frequency of the recirculation pumps, at any speed of the recirculation pumps.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A clamp apparatus for repairing a riser brace assembly in a nuclear reactor, the riser brace assembly including a block connecting the riser brace assembly to a wall of the nuclear reactor, comprising:

a first plate arranged so as to mate with a first groove on the block; and a second plate arranged so as to mate with a second groove on the block, the first and second plates being fixedly secured to the riser brace assembly.

2. The clamp apparatus of claim 1, further comprising a wedge assembly provided between the first and second plates.

3. The clamp apparatus of claim 2, wherein the riser brace assembly includes an upper leaf having a top surface engaging the first plate and a bottom leaf having a bottom surface engaging the second plate, and the wedge assembly engaging a bottom surface of the upper leaf arid a top surface of the bottom leaf between the first and second plates.

4. The clamp apparatus of claim 2, wherein the wedge assembly further includes a plurality of wedge components to evenly distribute stress on surfaces of the riser brace assembly.

5. The clamp apparatus of claim 4, wherein one of the wedge components includes a key that engages a slot in one of the first and second plates.

6. The clamp apparatus of claim 1, wherein the block includes the first groove provided on a top surface thereof and the second groove provided on a bottom surface thereof for engaging the first and second plates.

7. The clamp apparatus of claim 1, wherein the first and second plates include tongue portions for engaging the first and second grooves.

8. The clamp apparatus of claim 7, wherein the tongue portions are tapered.

9. The clamp apparatus of claim 6, wherein the first and second plates include tongue portions for engaging the first and second grooves.

10. The clamp apparatus of claim 9, wherein the tongue portions are tapered.

11. The clamp apparatus of claim 1, wherein the first and second plates are fixedly secured to the riser brace assembly with mechanical fasteners adapted to provide clamping forces.

12. The clamp apparatus of claim 1, wherein the first and second plates engage each other via a tongue and groove interface.

13. A clamp apparatus for structurally replacing a defective weld used to attach a riser brace assembly in a nuclear reactor, the riser brace assembly having upper and lower riser brace leaves, comprising:

a top plate arranged so as to mate with a first groove on the upper riser brace leaf;

a support plate arranged so as to mate with a second groove on the lower riser brace leaf; and a wedge assembly provided between the top plate and support plate applying forces against surfaces of the upper and lower riser brace leaves that are opposite the first and second grooves.

14. The clamp apparatus of claim 13, further comprising a plurality of fasteners for applying clamping forces to fixedly secure the top plate and support plate to the riser brace leaves.

15. The clamp apparatus of claim 13, wherein the top and support plates engage each other via a tongue and groove interface.

16. A clamp apparatus adapted to be attached to a riser brace assembly within a nuclear reactor for repairing the riser brace assembly, the riser brace assembly fixedly attached between a riser pipe in the nuclear reactor and a wall of the reactor, the riser brace assembly composed of a riser brace block attached to the wall, an upper riser brace leaf and a lower riser brace leaf, the upper and lower riser brace leaves in spaced vertical relation from each other and attached between the riser brace block and to the riser pipe via a riser brace plate, the clamp apparatus comprising:

a first plate arranged so as to mate with a first groove on the riser brace block; and a second plate arranged so as to mate with a second groove on the riser brace block, the first and second plates being fixedly secured to the riser brace block.

17. A clamp apparatus adapted to be attached to a riser brace assembly within a nuclear reactor for structurally replacing a defective weld used to fixedly attach the riser brace assembly to a wall of the reactor, the riser brace assembly composed of a riser brace block attached to the wall, an upper riser brace leaf and a lower riser brace leaf, the upper and lower riser brace leaves in spaced vertical relation from each other and attached between the riser brace block and to the riser pipe via a riser brace plate, the clamp apparatus comprising:

a top plate engaged with a first groove on the upper riser brace leaf;

a support plate engaged with a second groove on the lower riser brace leaf; and a wedge assembly provided between the top plate and support plate applying forces against surfaces of the upper and lower riser brace leaves that are opposite the first and second grooves.

* * * * *